United States Patent Office 2,944,941
Patented July 12, 1960

2,944,941
METHOD AND DENTIFRICE FOR REDUCING GINGIVAL INFLAMMATION

Lucien Goldenberg, New York, N.Y., assignor to Vaxico, Inc., Union City, N.J., a corporation of New Jersey No Drawing. Filed Dec. 23, 1957, Ser. No. 704,267

21 Claims. (Cl. 167—78)

This invention relates to a dentifrice having incorporated therein a polyvalent and polygenic vaccine which is effective when used in the normal manner of using a dentifrice to substantially reduce gingivitis during use thereof. The vaccine comprises a plurality of bacterial species and strains, in lysed and unlysed form, found in oral cavities of gingivitis patients, the plurality taken at least from the pyogenic group of Streptococci, optionally including also at least *Staphylococcus aureus* and *Staphylococcus albus*, and preferably including various other species.

Tooth diseases are divided broadly into two categories. The first is direct attack on the teeth, such as dental caries, which is not directly concerned in the instant application. The second is attack on the tooth supporting structure, which is broadly termed periodontal diseases and with which this application is concerned. The periodontium (or support structure) includes (1) the alveolar bone in which the teeth roots are embedded, (2) the gingiva (or gums) which cover the alveolar bone, and (3) the periodontal membrane, which holds the teeth roots to the alveolar bone.

An inflammation of the gingiva is known as gingivitis, which creates discoloration, swelling, bleeding, pain, etc. of the gums in various combinations and severity. If the inflammation has spread beyond the gingiva to include the alveolar bone or the periodontal membrane, the condition is known as periodontitis which, if it continues long enough, will result in erosion and resorption of the alveolar bone and subsequent loosening of the teeth and misalignment thereof. It is this ultimate condition which the laymen tend to call "pyorrhea." Pyorrhea is primarily a lay term used to cover a wide variety of ill-defined conditions and considered an undesirable term by most of the dental profession which they prefer to avoid. A fourth term, periodontosis, is also quite common and is generally used to describe a non-inflammatory involvement of the periodontia and is sometimes used to refer to the results per se of extreme periodontitis apart from the inflammation, i.e., the physical aspects of misalignment of teeth and eroded pockets within the alveolar bone per se, regardless of whether inflammation is present in the tissues or not. In some instances, the inflammation has subsided or disappeared, leaving only the physical aspects of misalignment, erosion, etc. This brief resume of the various dental terms, as to their meaning when used herein, is desirable because the meaning of the terms is quite variable when used in the art.

The vaccine toothpaste of the instant application has been found to successfully treat gingivitis and to relieve the symptoms thereof, such as discoloration of the gums, swollen gums, bleeding gums and pain within the gums. However, the toothpaste will not generally be successful against periodontitis and surely will not correct misaligned teeth or replace eroded bone structure. Therefore, it is not to be considered a cure for severe periodontitis although it may relieve the inflammation of the gingiva normally connected with severe periodontitis. If, however, for example, a patient has periodontosis of the type created by a prior history of periodontitis, i.e., misaligned teeth or old abscess pockets in the alveolar bone but in which the inflammation has now disappeared, then the instant vaccine toothpaste would have no effect except possibly to preclude a return to the previous inflammatory conditions.

The successful treatment of periodontal diseases has eluded investigators for centuries and, in fact, not even the causes of the conditions are yet known. Vaccine treatment by needle injection has been tried but is relatively expensive and also a painful process, particularly where continuous treatments are involved. Antiseptics and other chemical treatments have been tried with little success. A penicillin toothpaste has been tried, but a high percentage of allergic reactions develop, and also penicillin resistant strains of bacteria evolve in many cases. Mechanical treatment (curettage) of the gums and teeth roots is successful in some cases, but is very painful, laborious and expensive, so that it is only resorted to in the worst cases. Such treatments sometimes cause more damage than good, especially where they are repeated.

Treatments involving topical application of a vaccine to the gums have not been considered practical primarily because it is considered that to be effective the vaccine must be absorbed, either into the vascular system or the local gum tissue cells and that mere application of the vaccine to the gums does not insure that it will effectively penetrate the gum surface. Moreover, vaccines prepared in the conventional way and applied topically have not been found to insure satisfactory results.

At first glance, the idea of incorporating a vaccine into a dentifrice and using the dentifrice as a carrier for the vaccine would seem to be even less promising that the direct application of a vaccine to the gums by a dentist or physician. For one thing, it is well known that vaccine preparations are very critical in regard to the retention of antigenic activity, i.e., the property which causes formation of antibodies in clinical subjects.

It is usually necessary, for example, to keep the vaccines refrigerated at low temperatures and in air-tight containers. The use of vaccines is prohibited after short exposure to room temperature and the normal atmosphere due to the loss of antigenic activity and sterility.

In the preparation and use of vaccines generally, it is very important to maintain at all times sterile conditions to avoid dangerous reactions caused by any foreign material in the vaccine upon injection intravenously, intramuscularly or subcutaneously.

For the above reasons, it was hardly to be expected that the effective activity of a vaccine preparation would be retained for any reasonable length of time if the vaccine were to be incorporated into a substrate such as one of the conventional dentifrice compositions, or that if there were any retention of effective activity that would be sufficiently manifested when the dentifrice is applied by a tooth brush to the gums of the patient.

However, I have found that it is possible by formulating the dentifrice substrate with regard to the conditions that have a critical bearing on the retention of the effective activity of the vaccine and by using a specially prepared polyvalent and polygenic vaccine, to produce a vaccine dentifrice that will upon regular use substantially reduce gingivitis infections in the user.

I have also found that this dentifrice not only maintains the effective activity of the vaccine, but it is also retained for a long period of time. The dentifrice has been found to be active after five years storage at room temperature and appears to maintain its potency almost indefinitely.

It is an object of this invention to provide a dentifrice which has incorporated therein, in lysed and unlysed form, a polyvalent and polygenic vaccine selected from the bacterial flora generally present in the oral cavity during gingivitis, which are thought either to initiate gingivitis or to cause a secondary invasion subsequent to initiation by another agent.

It is also an object of this invention to provide a dentifrice having the above-described vaccine incorporated therein, wherein said plurality of bacteria is taken at least from the pyogenic group of Streptococci, optionally including also at least *Staphylococcus aureus* and *Staphylococcus albus*, and preferably including various other species.

An additional object of this invention is to provide a simple means of obtaining substantial reduction of gingivitis by the public by the simple and regular use of a dentifrice.

Another object of this invention is the incorporation of a polyvalent and polygenic vaccine into a dentifrice substrate that will protect the activity of the vaccine and act to increase its effectiveness when the dentifrice is applied to the gums.

A further object of this invention is to provide a vaccine dentifrice that need not be stored under special conditions such as refrigeration, sealed from the atmosphere, etc., to retain a satisfactory degree of effective activity against gingivitis over a period of several years.

An additional object of this invention is to provide a vaccine for local and topical application so that it is unnecessary to maintain the extreme sterile conditions that must be observed in preparing, storing and injecting vaccines in general use at the present time.

I believe the surprising and highly satisfactory properties of my vaccine dentifrice are due both to the fact that I use a specially prepared and highly potent vaccine and also to the selection and proportioning of the ingredients of the dentifrice substrate with a view to insuring their coaction with the vaccine to protect the vaccine against loss of effective activity and to bring about more favorable conditions for the vaccine to act on the gums of the user during use of the dentifrice.

The vaccine is prepared by making a predetermined bacterial mixture which is taken from a plurality of bacterial species cultures which insure plentiful growth of the individual species. Cultures from the mouths of several infected individuals are originally inoculated into various culture media to insure growth of all bacteria present. The individual species desired are then isolated through a series of reinoculations on desirable culture media for the particular species according to recognized bacteriological techniques. The cultures are generally incubated at 37° C. for about 24 to 48 hours. After pure cultures are obtained, those species that can be tested to antigenicity are so tested with those cultures that do not demonstrate strong antigenic activity being discarded. However, some species are not so tested for antigenicity because procedures are not yet konwn. It is known that many properties of bacteria change during many successive subcultures and generally there is a lessening of the antigenic activity. Therefore, as a matter of desirable technique to secure a strong vaccine, no cultures are extended beyond 12 subcultures after the original inoculation; and, in fact, it is preferred to use the first to third subcultures. Once a desirable species and strain is isolated, it may be lyophilized for indefinite storage without further subculturing.

The bacterial species of a given vaccine are selected from any of those aerobic and anaerobic species found in the oral cavities of individuals having gingivitis, it being understood, of course, that many, if not all, of the same species will be noted at some time in a supposedly healthy or normal oral cavity. These species include the following, which, however, is not to be construed as a complete list thereof. The nomenclature of the bacterial species herein has largely been taken from "Bergey's Manual of Determinative Bacteriology," seventh edition (1957), but older names still in common usage have been additionally referred to in some instances. In other instances, terminology more common to the dental arts has been retained.

Streptococcus genus:

| | |
|---|---|
| *Streptococcus viridans* (alpha) | |
| *Streptococcus hemolyticus* (beta) | |
| *Streptococcus anhemolyticus* (gamma) | Pyogenic group |
| *Streptococcus mitis* | |
| *Streptococcus salivarius* | |
| *Streptococcus faecalis* (enterococcus) | |
| *Anaerobic streptococci* | |

Diplococcus genus:
  Diplococcus pneumoniae I, II, III and IV

Staphylococcus genus (sometimes called Micrococcus):

| | |
|---|---|
| Staphylococcus aureus | |
| Staphylococcus albus | Sometimes all called *aureus* |
| Staphylococcus citreus | |

Gaffkya genus:
  *Gaffkya tetragena*

Corynebacterium genus:
  Corynebacterium diphtheriae
  Corynebacterium pseudodiphtheriticum
  Corynebacterium diphtheroides Lactobacillus genus Escherichieae genus:
  Escherichia coli Klebsiella genus:
  Klebsiella pneumoniae (Friedlander's bacillus)

Proteus genus:
  Proteus vulgaris

Neisseria genus:
  Neisseria catarrhalis
  Neisseria sicca (*Neisseria pharyngis*)
Gram positive bacilli
Gram negative bacilli
Coliform bacilli These bacteria are not only those found in oral infections by myself or others, but most are also known for their marked antigenic properties. Moreover, there is not even agreement among bacteriologists as to the above nomenclature or even existence of some species. In my parent applications, I referred to the first five Streptococci species as *Streptococcus pyogenes*, which formerly was common terminology to include this entire closely related group, which was thought to be a single species. Subsequently, at least five species have been identified in the group. However, the alpha, beta and gamma names are now being questioned by some as characteristics only that may be applied to many bacterial species. Thus, Bergey's seventh edition does not list alpha, beta and gamma streptococci, but does list a species *Streptococcus pyogenes*, which is apparently similar to the above *Streptococcus hemolyticus*. The same edition lists viridans as a group which includes salivarius and mitis, among others. However, "Oral Microbiology and Infectious Disease" by Burnett and Scherp, 1957 edition, does list alpha, beta and gamma species in the oral cavity (page 234).

The above list includes the three traditional Staphylococci found in the mouth, namely, *aureus, albus,* and *citreus*, which are named and conventionally distinguished by the gross color appearance of their colonies as orange, white and yellow, respectively. Bergey's seventh edition declares that the three alleged species are only one and should be called only *Staphylococcus aureus*. Thus, the problem of even listing bacterial species will be apparent. Therefore, the specific examples given from the Streptococcus genus and Staphylococcus genus above are more in conformity with traditional dental practice (see Burnett and Scherp) than with Bergey's seventh edition.

At the present time, it is not known whether bacteria or what group of bacteria are particularly related to gingivitis, so that a mixture of bacteria found in these infections is used. If it were definitely established that a particular group of bacteria or an individual species were responsible for a particular condition, then a vaccine could be made using that particular group or single bacteria, but otherwise following the method outlined herein.

After the individual bacterial species have been isolated through successive subcultures, they are mixed in a predetermined numerical ratio. A first portion (generally one half) of the selected bacterial mixture is placed in a 3.3% sodium hydroxide solution and stored in an incubating oven at 37° C. for about 24 hours. Subsequently, the solution is neutralized with dilute hydrochloric acid at which point it is isotonic due to the prearranged concentration of sodium hydroxide. It is then tested for sterility by sowing under aerobic and anaerobic conditions. It will be appreciated that lysis of the bacteria has taken place in this portion, i.e., the bacterial cell wall has been broken down so that the endoplasm and other constituents of the cell is freely in solution. It should also be understood that this lysed solution can be formed by any method of lysing bacteria such as chemical, mechanical or prolonged storage of dead bacteria under certain conditions, but it is important that the lysing conditions be such that the effective properties of the bacteria will not be destroyed.

A second portion (generally one fourth) of the bacterial mixture is heated to the lowest temperature necessary to obtain sterility (e.g., 56° C. for 1 hour) as shown by sterility tests carried out by inoculations in bullion, jelly and jelly vellion.

A third portion (the remaining one fourth) of the bacterial mixture is emulsified in a 1:4,000 solution of formaldehyde and then refrigerated on ice for about 24 hours, after which the bacteria are freed from formaldehyde by washing and the sterility checked in the same manner as described before.

The three portions of dead bacteria are then combined and diluted with an isotonic sodium chloride solution until a desired concentration is obtained. Once more the sterility of the composition is checked in aerobic and anaerobic media, and the purity may be tested by means of colored slides.

The bacteria killed by heat and formaldehyde are unlysed, i.e., form solutions of the intact, whole bodies of the bacteria and, thus, will have different antigenic characteristics than the lysed solution with which they are mixed. Furthermore, where the bacteria were killed by different means, even though the bacteria cell bodies remain intact, they result in different antigenic characteristics. Such distinctions are well recognized in the art.

It is desirable to have a mixture of lysed and unlysed bacteria (but dead) to form the vaccine used herein. The lysed and unlysed solutions may be made by various methods and/or agents so long as the antigenic properties of the resulting solution are not destroyed. I have disclosed the mixing of a single lysed solution and two unlysed solutions, but it will be appreciated that either type of solution may be singular or plural.

The manufacture of this vaccine containing lysed and unlysed bacteria is not considered novel in itself, but this particular type vaccine has been incorporated within the dentifrice described hereinbelow because it has a greater effective activity per volume unit than those generally used today for injections. This is due to at least two factors. By this method of making the vaccine, it is easy to obtain a concentration of 20 billion or more bacteria per cc. of vaccine which is much higher than normally found in vaccines. Furthermore, the effective activity of this vaccine is not a mere addition of the potency or activity of the individual portions but instead appears to be a multiple of the activity of those individual portions. In other words, the mixture as a whole tends to give a synergistic effect when compared with the potency of the individual portions. It will be appreciated that this is important in incorporating the vaccine into a dentifrice which will serve to actually dilute the vaccine concentration.

Polyvalent refers to the fact that the original samples of each bacterial species were obtained from several individuals, so that the vaccine contains different strains of the same bacterial species. The term could be applied where only one bacterial species makes up a vaccine. It has been shown that the use of different strains of the same bacterial species gives different antigens. The term "polygenic" is used, however, to indicate that the vaccine is made up of multiple species of bacteria. Thus, the use of a polyvalent vaccine insures the presence of many different bacterial strains of each species, and the use of a polygenic vaccine insures the presence of many bacterial species.

The following table illustrates one example of a dentifrice having a vaccine incorporated therein that is made according to this invention. It will be appreciated that all of the ingredients are not necessary, but that it has been found that these ingredients can be included without harming the effective properties of the vaccine. Such factors as taste, appearance and consistency are important in producing a marketable product and must be taken into consideration.

TABLE I

Ingredients:

| | | |
|---|---|---|
| Glycerin | grams | 41 |
| Calcium carbonate | do | 30 |
| Magnesium carbonate | do | 10 |
| Water | do | 2 |
| Soap—odorless and tasteless | do | 2 |
| Detergent—odorless and tasteless | do | 2 |
| Anhydrous dextrose | do | 1 |
| Oil of anise | do | 0.8 |
| Sodium benzoate | do | 0.5 |
| Oil of peppermint | do | 0.4 |
| Crystallized anethole | do | 0.4 |
| Ethyl alcohol | do | 0.2 |
| Gum tragacanth | do | 0.06 |
| Crystallized menthol | do | 0.03 |
| Vaccine solution | cc | 10 |

In preparing this dentifrice the gum tragacanth, water, sodium benzoate, dextrose and glycerin are first mixed together giving a viscous solution to which the soap and detergent are added without appreciable change in the liquid. This is followed by the calcium and magnesium carbonates to give a pasty consistency. To the paste is then added the vaccine and subsequently the remaining items which are flavoring items and are dissolved in the alcohol. The entire mixture will then be mixed for several hours and finally polished by passing through a roller milling machine. The particular flavoring items and ingredients mentioned above have been found to be non-destructive of the vaccine but it will be appreciated that other non-destructive ingredients may be used. This particular manner of mixing the ingredients has been found satisfactory but is not intended as a limitation. For example if concentrated soap and vaccine were mixed together prior to the addition of other ingredients, the soap might tend to destroy the effectiveness of the vaccine. Thus it will be generally desirable to add the vaccine near the end.

The more important compounds in the dentifrice are considered to be glycerin, a detergent, a sugar and the vaccine. The glycerin serves to protect the vaccine from other compounds in the dentrifice and from external factors during prolonged storage. A detergent (or soap) cleans the gums of the user by removing foreign matter, especially films so that the vaccine may be more readily absorbed through the gums. It is advisable, however, not to include a large quantity of the detergent because then it will coagulate the mucous tissue cells and thus prevent the penetration of the vaccine. Dextrose or another true sugar tends to enhance the action of the vaccine. To augment the function of the detergent it may be desirable to add a grit to the dentrifice which will aid in eliminating any film on the gums and will also aid the tooth brush in teasing and exciting the tissue so that penetration of the vaccine will be increased. The calcium carbonate will serve this purpose to some extent, of course.

Substances must be avoided in such a dentifrice that will destroy or reduce the effectiveness of the vaccine. Acids or strong alkalis would tend to destroy the vaccine. Oil-base dentifrices would reduce the effectiveness of the vaccine by reducing the rate of penetration. Such factors are extremely important when it is considered that normally a dentifrice is only in contact with the gums for a short period.

Penetration of the gum tissue has been shown by brushing the gums of a rabbit with a similar dentifrice containing methylene blue and taking precautions to avoid any of the compound going down the digestive tract. After a few hours the methylene blue will appear in the urine of the animal.

There has been much experimental work and discussion concerning general and local immunity, i.e., general immunity concerns the production of resistance throughout the body by the blood system, whereas local immunity concerns the producing of resistance within the particular tissue cells involved. Although the present invention is locally applied and substantially reduces gingival inflammation in human patients this invention is not limited to the physiological or pathological mechanisms involved in the reduction of the inflammation.

The results produced by this dentifrice are not secured by a single brushing of the teeth and are not retained over a period of time like classical immunity. It should be recognized that the reduction is acquired after brushing the teeth several times and is maintained on a permanent basis by habitual brushing of the teeth. However, since brushing of the teeth is part of normal hygiene practiced by most individuals today the acquiring of a substantial reduction by this means is very simple, easy and economical.

As will be shown in the clinical tests, in many instances a clinical change is noted in gingival inflammation within a week either after starting or stopping use of my vaccine toothpaste. This is a relatively short period of time for the production or destruction of antibodies in the vascular system which may indicate that the physiological mechanism is one of local immunity or perhaps even some unpostulated mechanism. However, the formation of antibodies in human patients can be demonstrated where my vaccine is injected into the body. In any event, the invention is not to be limited to any particular theory as to the mechanism responsible for the successful results.

Gingivitis when used herein is intended to be generic to any inflammation of the gingiva regardless of degree, severity or whether sufficient to be generally recognized as a diseased condition in a specific subject.

The clinical testing is easily divided into two separate categories which must be appreciated to fully understand the results or effectiveness of this invention. Various patients have been treated individually who had relatively severe gingivitis conditions which were such that the patient recognized something was wrong and complained about it. These patients have been greatly helped by the toothpaste and as individuals will be more cognizant of their improvement. Their cases have been reported in detail by various dentists.

Other patients have been treated as groups, the groups having been arbitrarily selected from institutions or student nurses. In these individuals, gingivitis can be demonstrated by close clinical examination but most of the patients are not aware of the condition. In fact, they tend to have normal gingiva within the particular environment and the young student nurses would be expected to exhibit very healthy gingiva.

The group patients have been reported by utilizing the "PMA" recording system of Schour and Massler. This method involves recording the inflamed papillary (P), marginal (M) and attached (A) gingivae on the buccal side of every tooth in the subject's mouth. One point is given for every such inflamed area so that an individual with 32 teeth may have a PMA score ranging from 0 to 96, although scores below 5 are very rare. Thus this system is sensitive enough to show inflammation in what is generally considered a healthy mouth. The "PMA" system apepars to be the best accepted system at the present time for quantitatively reporting gingival inflammation which is essentialy a qualitative manifestation that cannot be absolutely transposed to quantitative units.

It will be noted that gingival inflammation is reduced by use of this toothpaste in both situations, i.e., whether the individual is aware of the original pathological condition or not. Thus this toothpaste can be used as a prophylaxis for the general public as well as a treatment for a more serious condition.

The following specific examples of vaccines incorporated in a toothpaste will disclose 5, 7, 11 and 12 bacterial species respectively in the vaccine portion, assuming, of course, that the pyogenic streptococci are 5 separate species and that *Staphylococcus aureus* and Staphylococcus are 2 separate species. If these streptococci and staphylococci are each considered a single species, the vaccines include 1, 2, 6 and 7 species, respectively.

Aside from this difficulty of nomenclature and/or identification of bacterial species, the dental art has not settled the problem of whether bacteria are the etiological agents of gingivitis or merely secondary invaders. In either event, a single bacteria or even the same particular group are not always involved in different patients.

Thus I have selected groups of bacteria that are most commonly found in gingivitis conditions. A single bacterial species would be useful in a certain number of cases (and probably a high percentage of cases if an autogenous vaccine were prepared) but for practical purposes a plurality of species are preferred to combat the wholly unspecific disease entity of gingivitis. The pyogenic streptococci appear to be the most important so that again for practical purposes I always consider this group as my starting point although undoubtedly certain cases would respond to a toothpaste vaccine without any of the pyogenic group. Furthermore, it is not necessary to include all five of my pyogenic species, although each makes a certain contribution within a large number of patients but not to each patient.

If it is shown that a single bacterial species is the major invader in a single patient or even a large number of patients, it would be practical to make up a vaccine toothpaste with that single species. (For example, flu vaccines generally include a plurality of viruses but the recent Asiatic flu dictated a vaccine containing a single virus because of the prevalence of that single virus. That vaccine will probably be practically useless against subsequent flu epidemics.) Thus the scope of my invention includes a single bacterial species but for practical purposes this would seldom be incorporated into the toothpaste.

My vaccine solution before incorporation into the toothpaste has a concentration of about 20 billion bacteria per cc. so that 10 cc. of this added to 90 grams of other toothpaste ingredients gives a toothpaste concentration of 2 billion bacteria per gram. The concentration of the vaccine could readily be increased many times by merely adding less diluting solution (isotonic saline) but this particular vaccine concentration is convenient in securing the desired toothpaste consistency and has also proven effective. If desirable, however, the toothpaste concentration could also be increased by changing the relative proportions of the ingredients.

The following examples demonstrate the clinical results obtained in the use of my dentifrice on human subjects:

Example I

A toothpaste base as shown in Table I had incorporated therein the following vaccine and was then used by patients twice daily to brush their teeth under instructions to also brush the gums:

TABLE II

| Species: | Number in vaccine, billions/cc. |
| --- | --- |
| Streptococcus viridans | 1.2 |
| Streptococcus hemolyticus | 1.2 |
| Streptococcus anhemolyticus | 1.2 |
| Streptococcus mitis | 1.2 |
| Streptococcus salivarius | 1.2 |
| Streptococcus faecalis | 2 |
| Staphylococcus aureus | 4 |
| Staphylococcus albus | 2 |
| Klebsiella pneumoniae | 2 |
| Escherichia coli | 2 |
| Gaffkya tetragena | 2 |

Five groups of patients were selected at random, groups I, II and III being from a chronic mental hospital ward and groups IV and V being female student nurses. Groups I and II were males and group III were females. A control dentifrice having the identical formula as shown in Table I but without the vaccine was used for group I throughout the tests, for group IV from 0 to 56 days and for group III from 56 to 70 days.

TABLE III

[Numbers in table represent degree of gingivitis as determined by average PMA scores.]

| Group | No. | Age | Days | | | | | | | | | |
| --- | --- | --- | --- | --- | --- | --- | --- | --- | --- | --- | --- | --- |
| | | | 0 | 7 | 14 | 21 | 28 | 35 | 49 | 56 | 63 | 70 |
| I | 20 | 18–65 | 17 | 16 | 14 | | | | | 14 | | |
| II | 21 | 18–65 | 23 | 12 | 12 | | | | | 11 | | |
| III | 28 | 22–75 | 21 | 12 | 10 | | | 6 | | | | |
| IV | 17 | 18–24 | 12 | 6 | 4 | 5 | 3 | | | 3 | 10 | 11 |
| V | 21 | 18–24 | 13 | 14 | 13 | 13 | 14 | | | 13 | 4 | 3 |

Groups II, III and IV showed a marked reduction while using the vaccine toothpaste. Little change occurred in control group I or group V from 0 to 56 days while using the control toothpaste. However, between 56 to 70 days when group V used the vaccine toothpaste, an immediate and marked reduction is noted. Moreover, when group IV were given the control toothpaste from 56 to 70 days, the PMA scores returned to a level comparable to that before use of the vaccine dentifrice. This double reverse control test made on the two student nurse groups IV and V demonstrates very markedly the effectiveness of my vaccine toothpaste.

The above vaccine toothpaste was also used by 29 patients, age 20 to 65, 20 females and 9 males, under the care and advice of five different dentists. All of these patients were concerned with the condition of their gums and complained of varying symptoms such as bleeding, pain, presence of pus, discoloration, foul odors, swelling, etc. The patients were observed from one week to four months while using the vaccine toothpaste and in each instance their condition markedly improved or generally the symptoms disappeared. Three of these patients were pregnant and had what is commonly termed "pregnancy gingivitis," i.e., the gingivitis occurs only during the pregnancy or is at least markedly aggravated thereby. Their conditions were also quickly and markedly improved. One patient had no bleeding from her gums for the first time in 15 years, despite all kinds of treatments. Several of the patients returned to their pretreatment condition after stopping the use of the vaccine toothpaste. However, on reusing the vaccine toothpaste, the gingivitis conditions were again arrested.

Example II

A toothpaste similar to Example I was made except the bacterial content was as follows:

| Species: | Number in vaccine, billions/cc. |
| --- | --- |
| Streptococcus viridans | 1.2 |
| Streptocossus hemolyticus | 1.2 |
| Streptococcus anhemolyticus | 1.2 |
| Streptococcus mitis | 1.2 |
| Streptococcus salivarius | 1.2 |
| Staphylococcus aureus | 4 |
| Staphylococcus albus | 2 |
| Klebsiella pneumoniae | 2 |
| Escherichia coli | 2 |
| Diplococcus pneumoniae I | 1 |
| Diplococcus pneumoniae II | 1 |
| Neisseria catarrhalis | 2 |

The above vaccine toothpaste was used by eleven patients, age 28 to 70, 7 females and 4 males, under the care and advice of two different dentists. All of these patients were concerned with the condition of their gums and most with severe bleeding, one woman having had bleeding gums for over ten years and another throughout her adult life and the bleeding persisted in both cases in spite of attempting all kinds of conventional therapy. The patients exhibited varying degrees of gingivitis with the bleeding gums as demonstrated by soreness, swelling or puffiness and dark red coloring. The patients used the toothpaste and were observed from one month to two years and in each instance within a few weeks the bleeding had stopped and the other symptoms disappeared. In two instances, the use of vaccine toothpaste was stopped and the previous gingivitis conditions returned which, however, were again arrested on return to the toothpaste. Some of these patients subsequently used the vaccine toothpaste of Example I with no appreciable change in their improved gum conditions.

Example III

A toothpaste similar to Example I was made except the bacterial content was as follows:

| Species: | Number in vaccine, billions/cc. |
| --- | --- |
| Streptococcus viridans | 2 |
| Streptococcus hemolyticus | 2 |
| Streptococcus anhemolyticus | 2 |
| Streptococcus mitis | 2 |
| Streptococcus salivarius | 2 |
| Staphylococcus aureus | 6⅔ |
| Staphylococcus albus | 3⅓ |

Twelve female patients, age 31 to 74, were selected at random from a chronic mental hospital ward and used the above toothpaste for 21 days after a preliminary 9 day brushing period, during which they were instructed to brush the gums in the same manner as with the vaccine toothpaste. This preliminary period serves to eliminate results of the brushing per se. The following table shows the results in average PMA scores using the vaccine toothpaste:

| Days | 0 | 6 | 12 | 15 | 18 | 21 |
|---|---|---|---|---|---|---|
| Average PMA | 19.3 | 17.2 | 16.1 | 14.2 | 12.5 | 12.6 |

In some instances the examiner kept a qualitative record of gross gingival inflammation by recording 0 through 4 for various degrees of inflammation from 0 to 4. In the above twelve patients, the examiner noted a gross reduction in seven of the patients, no change in one, and made no record in four.

Example IV

A toothpaste similar to Example I was made except the bacterial content was as follows:

| Species: | Number in vaccine, billions/cc. |
|---|---|
| Streptococcus viridans | 4 |
| Streptococcus hemolyticus | 4 |
| Streptococcus anhemolyticus | 4 |
| Streptococcus mitis | 4 |
| Streptococcus salivarius | 4 |

Fourteen female patients, age 31 to 71, were selected as described in Example III and used the above toothpaste in the same manner with the following results:

| Days | 0 | 6 | 12 | 15 | 18 | 21 |
|---|---|---|---|---|---|---|
| Average PMA | 19.3 | 18.1 | 18.1 | 16.4 | 16 | 14.8 |

A gross reduction was noted in one patient, no change in five patients and no recording in eight, in the examiner's qualitative record.

No toxic or other adverse effects have been noted in the testing of any of the examples noted hereinbefore and in fact the toxicity would appear comparable to ordinary toothpaste.

This application is a continuation-in-part of my co-pending application, Serial No. 357,897, filed May 27, 1953, now abandoned, which, in turn, was a continuation-in-part of my application, Serial No. 99,339, filed June 15, 1949, now abandoned.

I claim:

1. A dentrifice for treating gingivitis comprising a dentifrice substrate having a non-liquid consistency and a polyvalent and polygenic vaccine incorporated therein, said vaccine containing about eleven species of bacteria selected from species occurring in oral cavities during gingivitis, said vaccine including both lysed and unlysed solutions of said bacteria, said substrate being antigenically compatible with said vaccine.

2. The dentifrice of claim 1 wherein said species includes at least one selected from the pyogenic streptococcal group consisting of *viridans, hemolyticus, anhemolyticus, mitis* and *salivarius*.

3. The dentifrice of claim 2 wherein said species additionally includes at least one selected from the staphylococcal group consisting of *aureus* and *albus*.

4. The dentifrice of claim 3 wherein said substrate includes a substantial portion of a solid dentrifrice filler.

5. The dentrifice of claim 4 wherein said substrate is toothpaste.

6. The dentrifice of claim 5 wherein said toothpaste includes glycerin, a detergent, and a sugar in addition to said filler.

7. The dentifrice of claim 5 wherein said lysed solution is formed by lysing said bacteria in a weak sodium hydroxide solution and subsequently neutralizing the solution with hydrochloric acid and said unlysed solution is formed by killing said bacteria in two portions, one by heat and another by formaldehyde.

8. The dentifrice of claim 5 wherein said vaccine includes all of said pyogenic streptococcal species.

9. The dentifrice of claim 8 wherein said vaccine additionally includes *Staphylococcus aureus, Staphylococcus albus, Klebsiella pneumoniae, Escherichia coli, Diplococcus pneumoniae* I, *Diplococcus pneumoniae* II, and *Neisseria catarrhalis*.

10. The dentifrice of claim 9 wherein the concentration of bacteria is about 2 billion per gram of dentifrice, and the numerical ratio is *Staphylococcus aureus* 4, *Staphylococcus albus* 2, pyrogenic streptococci 6, *Klebsiella pneumoniae* 2, *Escherichia coli* 2, *Diplococcus pneumoniae* I 1, *Diplococcus pneumoniae* II 1, and *Neisseria catarrhalis* 2.

11. The dentifrice of claim 8 wherein said vaccine additionally includes *Staphylococcus aureus, Staphylococcus albus, Klebsiella pneumoniae, Escherichia coli, Streptococcus faecalis* and *Gaffkya tetragena*.

12. The dentifrice of claim 11 wherein the concentration of bacteria is about 2 billion per gram of dentifrice, and the numerical ratio is *Staphylococcus aureus* 4, *Staphylococcum albus* 2, pyrogenic streptococci 6, *Klebsiella pneumoniae* 2, *Escherichia coli* 2, *Streptococcus faecalis* 2, and *Gaffkya tetragena* 2.

13. A process for treating gingivitis in humans comprising the regular application of the dentifrice of claim 1 to human gingiva.

14. A process for treating gingivitis in humans comprising the regular application of the dentifrice of claim 3 to human gingiva.

15. A process for treating gingivitis in humans comprising the regular application of the dentifrice of claim 5 to human gingiva.

16. The process of claim 15 wherein said toothpaste is applied daily by brushing said gingiva.

17. A process for treating gingivitis in humans comprising the regular application of the dentifrice of claim 7 to human gingiva.

18. A process for treating gingivitis in humans comprising the regular application of the dentifrice of claim 8 to human gingiva.

19. A process for treating gingivitis in humans comprising the regular application of the dentifrice of claim 9 to human gingiva.

20. A process for treating gingivitis in humans comprising the regular application of the dentifrice of claim 11 to human gingiva.

21. A process for treating gingivitis in humans comprising the regular application of the dentifrice of claim 12 to human gingiva.

References Cited in the file of this patent

UNITED STATES PATENTS

| 1,581,340 | Goldenberg | Apr. 20, 1926 |
| 2,042,359 | Putt | May 26, 1936 |
| 2,054,742 | Elbel | Sept. 15, 1936 |
| 2,216,816 | Kuever | Oct. 8, 1940 |
| 2,236,828 | Muncie | Apr. 1, 1941 |
| 2,340,318 | Gerlough | Feb. 1, 1944 |

FOREIGN PATENTS

| 25,675 | Great Britain | 1909 |

OTHER REFERENCES

Cook: Remington's Practice of Pharmacy, 9th ed., 1948, pp. 1338, 1341, Mack Pub. Co., Easton, Pa.

Gutman: Modern Drug. Encycl. and Thera. Guide, N.Y., 1934, pp. 705, 706, 708, 749, 762, 763 and 778–780.

Brown: Bacteriology of Pyorrhea Alveolaris, reprint from New York Med. Jour., Dec. 20, 1913, pp. 4, 5, 8 and 9.